United States Patent
Couperthwaite

(10) Patent No.: US 12,008,905 B2
(45) Date of Patent: Jun. 11, 2024

(54) CURB DETECTION SYSTEM FOR COMMERCIAL VEHICLES

(71) Applicant: Stoneridge Electronics AB

(72) Inventor: John Couperthwaite, Ypsilanti, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 103 days.

(21) Appl. No.: 17/372,720

(22) Filed: Jul. 12, 2021

(65) Prior Publication Data

US 2022/0092984 A1 Mar. 24, 2022

Related U.S. Application Data

(60) Provisional application No. 63/080,132, filed on Sep. 18, 2020.

(51) Int. Cl.
*G08G 1/00* (2006.01)
*G01S 15/86* (2020.01)
(Continued)

(52) U.S. Cl.
CPC ............. *G08G 1/165* (2013.01); *G01S 15/86* (2020.01); *G01S 15/931* (2013.01);
(Continued)

(58) Field of Classification Search
CPC ........ G08G 1/165; G08G 1/166; G08G 1/161; G08G 1/163; G08G 1/164; G06F 16/2379;
(Continued)

(56) References Cited

U.S. PATENT DOCUMENTS

| 6,535,116 B1 * | 3/2003 | Zhou ................... B60C 23/0408 340/447 |
| 2013/0321627 A1 | 12/2013 | Turn, Jr. et al. |

(Continued)

FOREIGN PATENT DOCUMENTS

| CN | 103987577 A | * 8/2014 | ............. B60Q 1/525 |
| CN | 104210424 B | * 5/2017 | ............... B60R 1/00 |

(Continued)

OTHER PUBLICATIONS

International Search Report for International Application No. PCT/US2021/041216 completed on Oct. 11, 2021.
(Continued)

*Primary Examiner* — James J Yang
*Assistant Examiner* — Anthony D Afrifa-Kyei
(74) *Attorney, Agent, or Firm* — Carlson, Gaskey & Olds, P.C.

(57) ABSTRACT

A feature avoidance system for a vehicle including at least one ultrasonic sensor disposed on a vehicle and communicatively coupled to a vehicle controller. A dynamic vehicle model is stored in the controller. The dynamic vehicle model is a computer model of current and expected dynamic vehicle component positioning. An analysis module configured cause at least one of the controller and a remote processing system to identify a feature at least partially via data from the at least one ultrasonic sensor, compare a predicted feature position and an estimated vehicle component position, and generate an output in response to the predicted feature position and the estimated vehicle component position intersecting.

19 Claims, 4 Drawing Sheets

(51) Int. Cl.
*G01S 15/931* (2020.01)
*G06F 16/23* (2019.01)
*G06F 16/29* (2019.01)
*G08G 1/16* (2006.01)
*B60Q 9/00* (2006.01)

(52) U.S. Cl.
CPC .......... *G06F 16/2379* (2019.01); *G06F 16/29* (2019.01); *B60Q 9/008* (2013.01)

(58) Field of Classification Search
CPC .......... G06F 16/29; G06F 16/95; G01S 15/86; G01S 15/931; G01S 13/931; G01S 13/862; G01S 13/865; G01S 13/867; G01S 13/87; G01S 15/02; G01S 17/89; G01S 7/4021; G01S 7/497; G01S 19/13; G01S 2007/4043; G01S 2007/4977; G01S 2013/931; G01S 2013/9318; G01S 2013/93185; G01S 2013/9319; G01S 2013/932; G01S 2013/9322; G01S 2013/9325; G01S 2013/93271; G01S 2013/93272; G01S 2013/93273; G01S 2013/93274; G01S 2013/93275; G01S 7/4043; B60Q 9/008; B60W 30/09; B60W 10/18; B60W 10/20; B60W 30/0956; B60W 2554/404; B60W 2554/80; B60W 10/00; B60W 10/04; B60W 10/06; B60W 10/08; B60W 10/10; B60W 30/08; B60W 30/085; B60W 30/095; B60W 30/0953; B60W 40/04; B60W 40/08; B60W 40/09; B60W 40/105; B60W 50/0097; B60W 50/0098; B60W 50/08; B60W 50/082; B60W 2040/0809; B60W 2050/0004; B60W 2050/0014; B60W 2050/143; B60W 2300/34; B60W 2510/08; B60W 2510/18; B60W 2520/04; B60W 2520/105; B60W 2540/043; B60W 2540/18; B60W 2540/22; B60W 2540/30; B60W 2554/00; B60W 2556/45; B60W 2556/55; B60W 2556/65; B60W 2710/18; B60W 2710/20; B60W 2756/10; B60W 2900/00; G06Q 30/0266; G06Q 30/0269; B60R 11/04; B62D 15/00; B62D 15/0265; G01C 21/3407; G01C 21/3461; G01C 21/3484; G01C 21/3492; G01C 21/3691; G02B 27/0006; G05D 1/0061; G05D 1/0088; G05D 1/0212; G05D 1/0214; G05D 1/0221; G05D 1/0276; G05D 2201/0212; G07C 5/0808

See application file for complete search history.

(56) References Cited

U.S. PATENT DOCUMENTS

2016/0297430 A1    10/2016   Jones et al.
2016/0357262 A1    12/2016   Ansari
2017/0103270 A1*    4/2017   Reiff .................... G06V 20/59
2018/0319393 A1    11/2018   Najjar et al.
2021/0061307 A1*    3/2021   Connell ................ G06V 20/58

FOREIGN PATENT DOCUMENTS

CN          104228831              5/2019
GB          2449553 A       *   11/2008    ......... B62D 53/0814
JP          6415642 B1      *   10/2018
WO      WO-2018164377 A1   *    9/2018    ............ G01C 21/28
WO          2019238330          12/2019

OTHER PUBLICATIONS

International Preliminary Report on Patentability for International Application No. PCT/US2021/041216 mailed Mar. 30, 2023.

* cited by examiner

CURB DETECTION SYSTEM FOR COMMERCIAL VEHICLES

CROSS-REFERENCE TO RELATED APPLICATION

This application claims priority to U.S. Provisional Patent Application No. 63/080,132 filed on Sep. 18, 2020.

TECHNICAL FIELD

The present disclosure relates generally to commercial vehicle driver assistance systems, and more particularly to a system for detecting and responding to a curb using ultrasonic sensors.

BACKGROUND

Commercial vehicle operators operate vehicles in multiple distinct locations and are frequently unfamiliar with the specific features of the area in which they are operating. In addition, certain aspects of the commercial vehicle, such as ego trailers and similar vehicle components, can block an operators view of environmental hazards or features that are close to the ground. Existing driver assistance systems assume that either the vehicle is a single solid component, with no relatively moving parts or that the vehicle includes ego parts, but non-ego parts are constantly maintained in a relative position.

The existing systems provide sufficient fidelity for collision avoidance with objects such as trees, pedestrians, signs, other vehicles and the like. However, features like curbs, raised medians, or other low to the ground road features cannot be accurately detected and avoided using existing image or camera based systems.

SUMMARY OF THE INVENTION

In one exemplary embodiment a feature avoidance system for a vehicle includes at least one ultrasonic sensor disposed on a vehicle and communicatively coupled to a vehicle controller, a dynamic vehicle model stored in said controller, the dynamic vehicle model being a computer model of current and expected dynamic vehicle component positioning, an analysis module configured cause at least one of the controller and a remote processing system to identify a feature at least partially via data from the at least one ultrasonic sensor, compare a predicted feature position and an estimated vehicle component position, and generate an output in response to the predicted feature position and the estimated vehicle component position intersecting.

In another example of the above described feature avoidance system for a vehicle the feature is identified without assistance of image date.

In another example of any of the above described feature avoidance systems for a vehicle the feature is identified exclusively using sensor data from the at least one ultrasonic sensor.

In another example of any of the above described feature avoidance systems for a vehicle the feature is identified using a combination of ultrasonic sensor data and at least one of map data and GPS data.

In another example of any of the above described feature avoidance systems for a vehicle the response includes an operator alert.

In another example of any of the above described feature avoidance systems for a vehicle the response includes an activation of a driver assistance system.

In another example of any of the above described feature avoidance systems for a vehicle the dynamic vehicle model is a robot operating systems (ROS) control model incorporating a steering angle of the vehicle, an Ackerman profile of the vehicle, and vehicle movement data.

In another example of any of the above described feature avoidance systems for a vehicle the feature is identified from the ultrasonic sensor data using a simultaneous localization and mapping (SLAM) modeling techniques to model the environment.

In another example of any of the above described feature avoidance systems for a vehicle the analysis module is further configured to apply the position of the identified feature to one of a map data and a GPS data thereby generating updated map data and to store the updated map data and GPS data in a database.

In another example of any of the above described feature avoidance systems for a vehicle the database is remotely accessible by at least a second vehicle.

In another example of any of the above described feature avoidance systems for a vehicle the feature is at least one curb.

In another example of any of the above described feature avoidance systems for a vehicle the analysis module is configured to cause the controller to perform each of identifying the feature at least partially via data from the at least one ultrasonic sensor, comparing the predicted feature position and the estimated vehicle component position, and generating the output in response to the predicted feature position and the estimated vehicle component position intersecting.

An exemplary method for detecting and avoiding feature collisions in a commercial vehicle includes generating a three-dimensional map of an environment based on sensor measurements from at least one ultrasonic sensor and locating the vehicle within the three-dimensional map, identifying at least one feature within the three-dimensional map distinct from the vehicle, comparing a predicted position of the at least one feature and an estimated vehicle component position at a future time, and generating an output in response to the predicted feature position and the estimated vehicle component position intersecting.

In another example of the above described exemplary method for detecting and avoiding feature collisions in a commercial vehicle the three-dimensional map is generated using a using a simultaneous localization and mapping (SLAM) system.

In another example of any of the above described exemplary methods for detecting and avoiding feature collisions in a commercial vehicle the at least one feature is a curb.

In another example of any of the above described exemplary methods for detecting and avoiding feature collisions in a commercial vehicle the vehicle component is a tire.

In another example of any of the above described exemplary methods for detecting and avoiding feature collisions in a commercial vehicle the at least one feature within the three-dimensional map distinct from the vehicle is identified using a combination of the sensor measurements from the at least one ultrasonic sensor and at least one of map data and GPS data.

Another example of any of the above described exemplary methods for detecting and avoiding feature collisions in a commercial vehicle further includes applying a position of the at least one feature within the three-dimensional map distinct from the vehicle to one of map data and GPS data and storing the updated one of map data and GPS data in a database.

In another example of any of the above described exemplary methods for detecting and avoiding feature collisions in a commercial vehicle the database is remotely accessible via at least one other commercial vehicle.

These and other features of the present invention can be best understood from the following specification and drawings, the following of which is a brief description.

DETAILED DESCRIPTION

Figure 1:
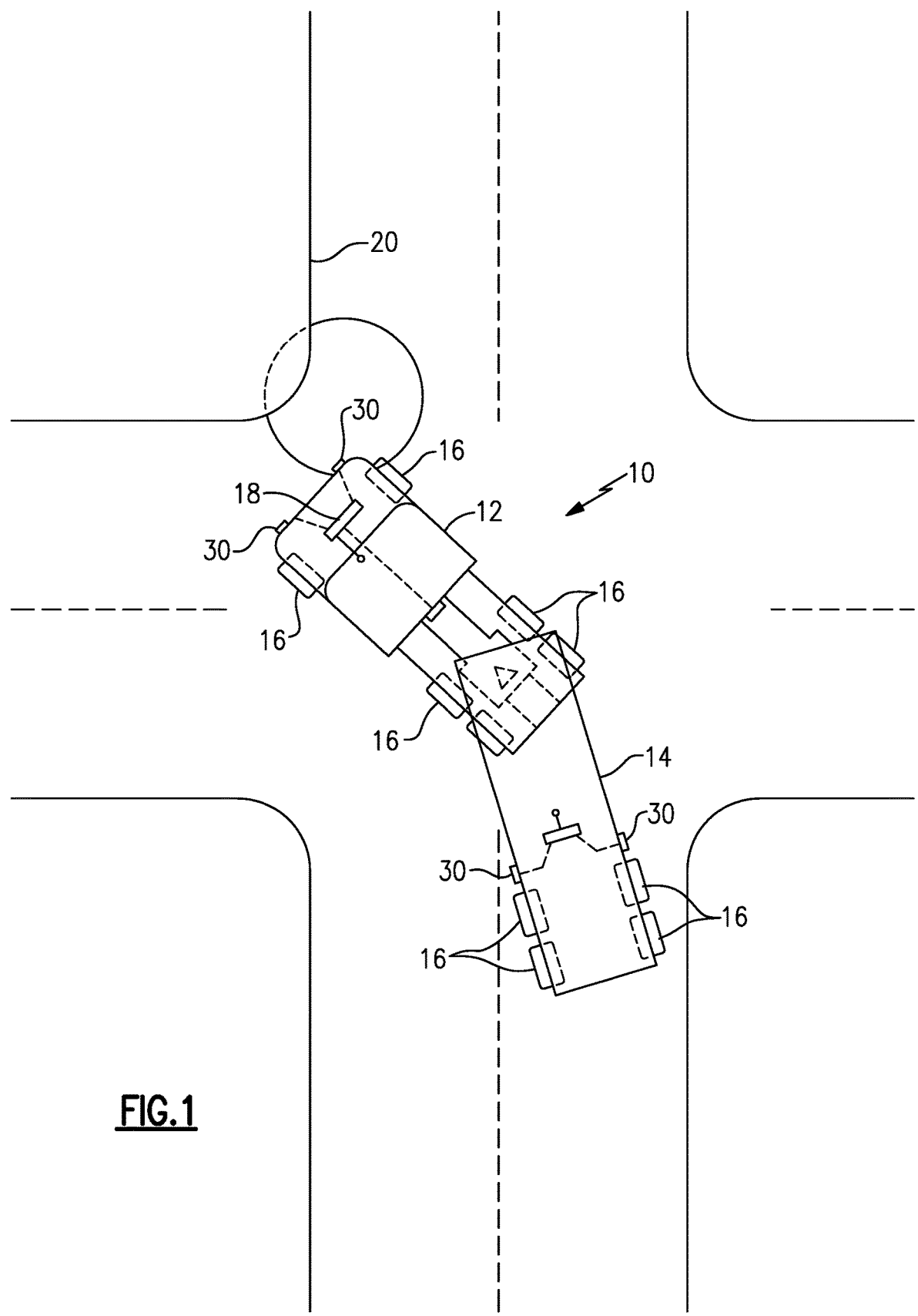
FIG. 1 illustrates an exemplary vehicle including an ultrasonic curb sensor system, with the exemplary vehicle executing a first maneuver.
Figure 2:
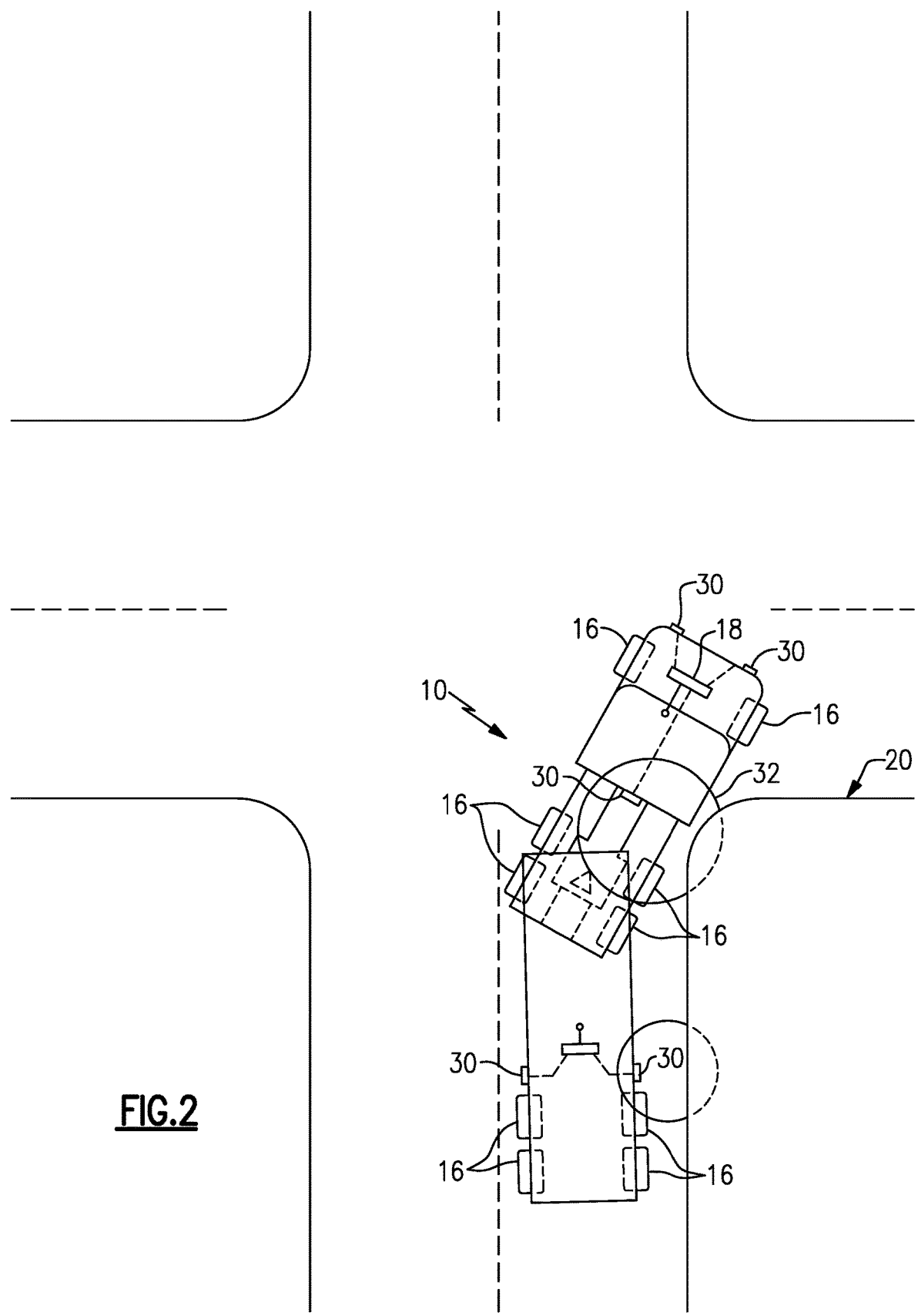
FIG. 2 illustrates the exemplary vehicle of FIG. 1 executing a second maneuver.
Figure 3:
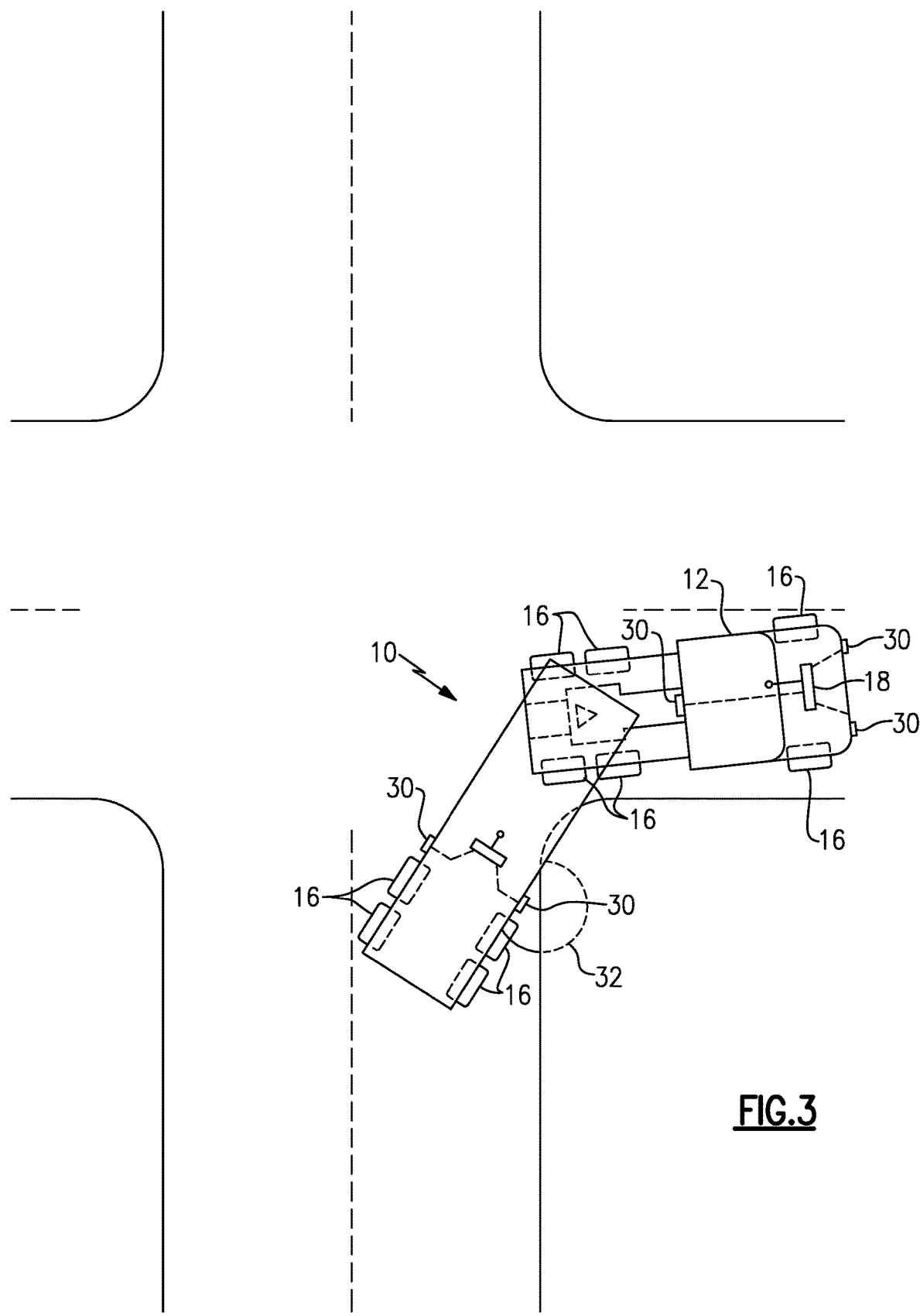
FIG. 3 illustrates the exemplary vehicle of FIG. 1 executing a third maneuver.

FIGS. 1-3 schematically illustrate a commercial vehicle 10 including a tractor 12 and a trailer 14. In the examples of FIGS. 1-3, the trailer 14 is an ego part (i.e. a part that moves at least partially independently of the tractor 12). The tractor 12 and trailer 14 include multiple wheels 16. While the wheels 16 are part of the tractor 12 and the trailer 114, at least some of the wheels rotate independently of the tractor 12 and trailer 14 in order to turn the vehicle 10 or turn with the vehicle 10. Wheel position sensors and vehicle steering systems with a controller 18 detect the relative positions of the wheels 16 and adjust a digital model of the vehicle 10 within the controller 18 based on the detected or determined wheel positions.

Certain environmental features, such as a curb 20, have a low enough profile that a main body of the tractor 12 or the trailer 14 can pass over the environmental feature without impacting the main body. Due to how low the features are relative to the ground it can be difficult for the vehicle operator to visually identify the precise position of the feature. This difficulty is exacerbated when the feature passes under a portion of the main body completely obscuring the view of the feature during a given vehicle maneuver.

Each of FIGS. 1-3 illustrates the vehicle 10 executing a similar maneuver in distinct environments, with FIG. 1 illustrating the vehicle 10 executing a left turn at a four-way intersection, FIG. 2 illustrating the vehicle 10 executing an initial portion of a tight right turn, and FIG. 3 illustrating the vehicle 10 executing an end portion of the tight right turn. Each maneuver demonstrates the susceptibility of a different portion of the vehicle 10 contacting the curb 20. In the example of FIG. 1, the front wheels, or axle connected to the front wheels 16 has a potential to impact the curb 20. In the example of FIG. 2, the rear wheels 16 of the tractor 12 have the potential to impact the curb 20, while in the example of FIG. 3, the wheels 16 and axle(s) at the rear of the trailer 14 have the potential to impact the curb 20. While three specific maneuvers are illustrated in the examples of FIGS. 1-3, it is appreciated that other maneuvers aside from turning at an intersection and other features aside from curbs can result in an intersection between the vehicle component and the environmental feature, and the alternative maneuvers and features can benefit from the system described herein in the same manner.

In order to prevent the wheels 16 from contacting the curb 20, the tractor 12 and trailer 14 include multiple three dimensional (3D) ultrasonic sensors 30. The 3D ultrasonic sensors 30 emit an ultrasonic signal 32 in a sphere around the sensor 30. Environmental objects, such as the curb 20, within a sensing radius of the ultrasonic sensor 30 reflect the ultrasonic signal back to the sensor 30 and the sensor 30 interprets the magnitude and direction of the reflected signal generate a three-dimensional map of an environment including the features within the range of the sensor 30. In some examples, the three-dimensional map takes the form of a point cloud. The point cloud is a set of points defined by a position in space where an ultrasonic reflection was detected. In the illustrated example there are two forward mounted ultrasonic sensors 30 and one rear mounted ultrasonic sensor 30.

In alternative examples, other mounting positions can be utilized to similar effect depending on what aspects of the vehicle 10 may extend below the main body and impact the curb or other road feature. Further, while each example illustrates a 3D ultrasonic sensor signal 32 location from a sensor 30 near the aspect of the vehicle that may impact the feature (e.g. the curb 20), one of skill in the art will appreciate that as long as a sensor 30 has passed by the feature in range of the sensor signal 32 of the corresponding sensor 30, the vehicle dynamics model and SLAM models are aware of the position of the feature and are able to determine a potential collision even after the feature is out of range of the sensor 30.

The controller 18 interprets the ultrasonic sensor data using a simultaneous localization and mapping (SLAM) system that maps the surrounding environment from the ultrasonic sensor data. Simultaneous localization and mapping (SLAM) is the computational problem of constructing or updating maps of unknown environments while simultaneously keeping track of an agent's location within the environment. There are several algorithms known for solving the computational problem including particle filters, extended Kalman filters, covariance intersections, and GraphSLAM. The SLAM algorithm used is tailored to the available resources. The algorithm is aimed at sufficient accuracy to allow the system relying on the SLAM to operate and are not aimed at perfect accuracy.

The generated three-dimensional map of the immediately surrounding environment including the curb 20 is provided to the controller 18, which pairs the map with a digital model of the vehicle components, including the relative positioning of the wheels 16. In some examples the relative positioning of the wheels 16 is determined exclusively via a wheel position sensor. In alternative examples the positioning of the wheels 16 relative to the vehicle 10 is determined at least in part via a robot operating system (ROS) model. Robot Operating System ROS) is a collection of software frameworks for robot software development including hardware abstraction, low-level device control, and similar robotic control functions. The ROS model is stored in the controller 18 and utilizes steering angle, Ackerman profiles, and movement data (e.g. vehicle dynamics such as speed, acceleration and the like) to determine a current and expected wheel position. In alternative examples other vehicle dynamic data can be used in conjunction with, or instead of, the specific vehicle dynamic data described here within the ROS model depending on the particular system being implemented. In yet further alternative examples, the ROS model can be replaced with any similar control suite and provide the same level and accuracy of control.

The sensor data from the ultrasonic sensors 30 combined with the digital model of the vehicle allows the controller 18 to create a predicted curb path and a predicted wheel placement path. The predicted paths are then compared to determine if an intersection is present. If an intersection between the predicted paths is identified, the controller determines that one or more of the wheels 16 will contact the curb 20, and the controller causes an automated driver assistance system (ADAS) to react to the imminent contact with the curb 20.

In some examples, the automatic driver assistance system can include audio warnings, visual warnings, haptic warnings and the like. In other examples, the warnings can be directional, relative to the vehicle operator, and indicate a specific wheel or other vehicle component that is expected to intersect with the curb. In other examples, the automatic driver assistance can include partial or complete control takeover of vehicle steering, braking, and related systems in order to prevent the imminent collision.

In some alternative examples, the analysis is not performed exclusively using the onboard vehicle controller 18. In one alternative, the ultrasonic sensor output is transmitted to a cloud services system, or a remote server, and the cloud services or remote server interprets the sensor data into a point cloud. The point cloud is then provided back to the vehicle controller 18, which compares the point cloud to the map data for performing the curb avoidance detection as described above. In another alternative, the sensor data is provided to the cloud services or remote server, and the full analysis is performed remotely. In this alternative the remote system determines when a collision is imminent and provides an indication to the vehicle controller 18 that a collision warning should be issued. Other alternative examples can include any similar form of processor load sharing, with some portions of the process being performed local to the vehicle, and other portions of the process being performed remote from the vehicle 10.

With reference to the illustration of FIGS. 1-3, FIG. 4 is a flowchart 100 for utilizing a combination of ultrasonic sensor mapping and vehicle dynamic modeling to assist a curb avoidance system. During operation, a vehicle controller 18 generates a vehicle dynamic model in a "Generate Vehicle Dynamic Model" step 110. The vehicle dynamic model is, in some examples, a simple wheel position determination utilizing wheel sensors configured to identify a current wheel position. In alternative examples, the vehicle dynamic model utilizes sophisticated vehicle control modeling such as ROS modeling which uses a combination of vehicle movement, Ackerman projection models, steering angle, and movement data to determine a dynamic vehicle model. In each example, the dynamic model includes relative positions of independent vehicle components that make up the entirety of the vehicle.

Once the vehicle dynamic model is developed and/or accessed in the controller, the controller uses the vehicle dynamic model to estimate the relative positions (e.g. wheel angle) of the vehicle components in an "Estimate Vehicle Component Positions" step 120. The estimated vehicle positions include a current position as determined by the vehicle sensors, as well as predicted future vehicle components according to the ROS modeling.

Simultaneously with the vehicle modeling, the controller 18 receives sensor data from the 3D ultrasonic sensors 30 and generates a 3D map of the environment within the sensing range of the 3D ultrasonic sensor 30 in a "Generate Curb Position Using Ultrasonic Sensor" step 130. The controller 18 includes a software module configured to interpret the 3D map generated by the ultrasonic sensor and distinguish a curb from other low to the ground features of the environment. In some examples, the controller identifies the curb and other low to the ground features exclusively using the 3D ultrasonic sensor data. In alternative examples, the sensor data is supplemented with other sensor data, potentially including image data.

Once the current curb position within the sensing range of the 3D ultrasonic sensor 30 has been determined, the controller extends the curb position in the direction of vehicle travel in an "Estimate Upcoming Curb Position" step 140. The extension of the curb position data is in some examples based on previously detected curb data. By way of example, if the previous measured curb position is curved at a certain arc, the controller 18 may estimate that the arc will continue for another preset distance. In alternative examples the estimation can use map data, gps data, or any similar positioning data to identify a general road or lot path on which the vehicle is positioned. Once determined, the road or lot edge is correlated with the detected curb from the 3D ultrasonic sensor data and the curb is extended along the correlated road or lot path.

In some examples, the estimate upcoming curb position step can further include an "Update Curb Position Database" substep 142. In this example, the actual sensed curb position from the 3D ultrasonic sensor data is applied to mapping data, or GPS data and stored in an online database that can be accessed by other vehicles including similar systems. In this way, the mapping data can be updated on the fly to reflect road or lot changes that may not be reflected in the map database or in the GPS database. In alternative examples, the sub-step 142 can record the sensed curb positions, correlate the curb data with a map, and update an online map database after a later connection to a broader network.

Once both vehicle component positions and the curb positions have been estimated, the controller compares the estimated positions to determine if there is an intersection in a "Compare Positions" step 150. When the positions intersect, a warning is output to the vehicle operator in an "Output Warning" step 160. As described above the warning can take any form including, but not limited to, audio, visual and haptic warnings. In alternative examples the warning can be accompanied by a partial or complete assumption of vehicle steering controls by a driver assist system.

Figure 4:
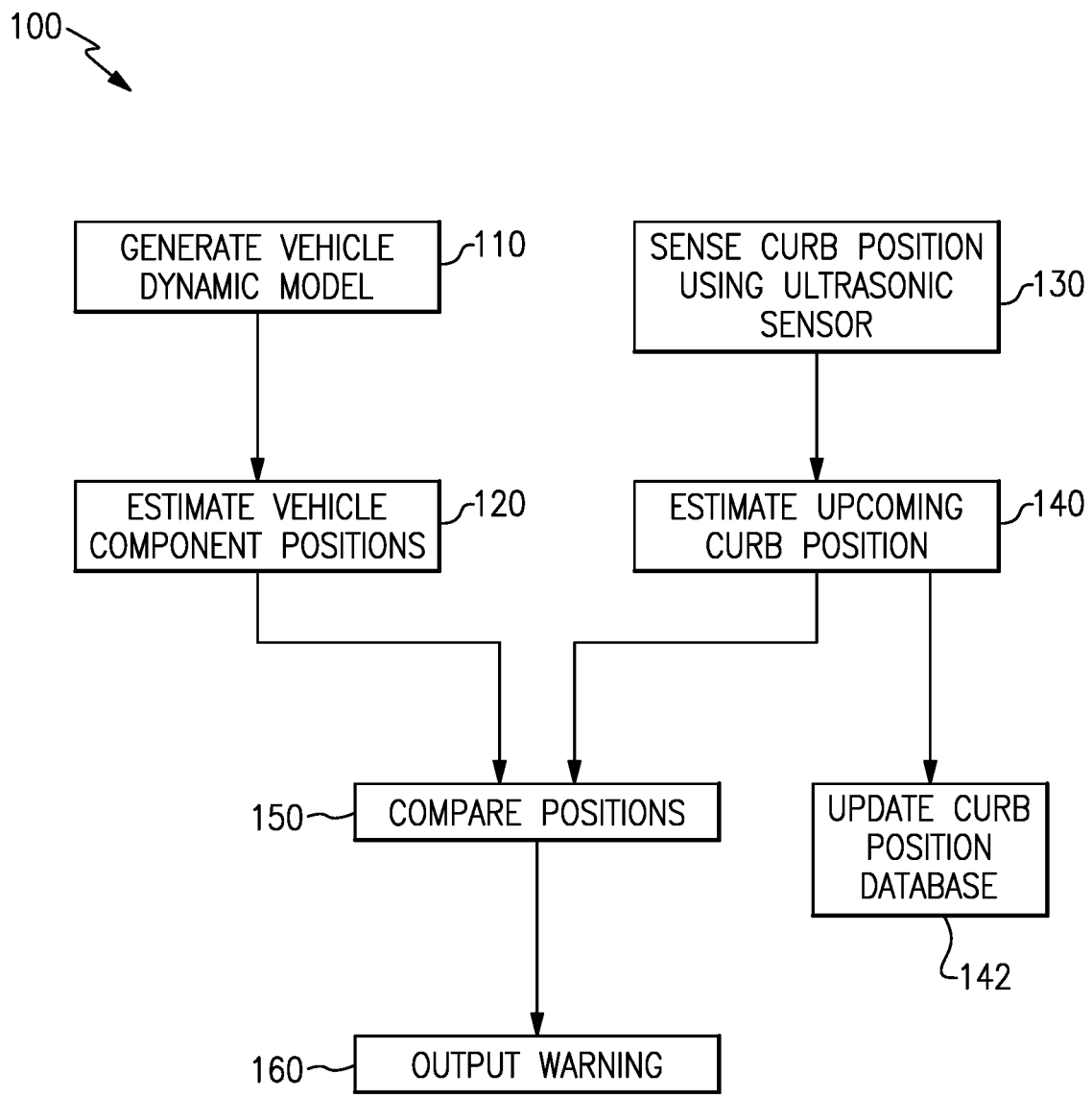
FIG. 4 illustrates a method for utilizing a combination of ultrasonic sensor mapping and vehicle dynamic modeling to assist a curb avoidance system.

While detailed above with regards to a curb avoidance system, it is appreciated that the system can be adapted or configured to facilitate avoiding wheel collisions with any low to the ground environmental feature. Further, it is appreciated that the feature can be extended to any vehicle component capable of movement relative to the primary vehicle body similar to wheels, and is not limited to wheels. Further, while the method of FIG. 4 is described specifically with regards to the operations being performed by the controller 18 located on the vehicle, it should be understood that in examples where the controller 18 is in communication with a remote server either through cloud based services, cellular data connections, or any similar data connection, any combination of the steps beyond the initial sensing of the environment using the ultrasonic sensor can be performed remotely by another computing system with the results of the remotely performed step(s) being provided back to the local controller 18 and the controller 18 proceeding with the method.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A feature avoidance system for a vehicle comprising:
   at least one ultrasonic sensor disposed on a vehicle and communicatively coupled to a vehicle controller;
   a wheel position sensor configured to detect or determine a position of a wheel, wherein the position of the wheel is provided on a trailer articulatable relative to a tractor;
   a dynamic vehicle model stored in said controller, the dynamic vehicle model being a computer model of current and expected dynamic vehicle component positioning including the position of the wheel, wherein the dynamic vehicle model is configured to be adjusted based upon the detected or determined position of the wheel;
   an analysis module configured to cause at least one of the controller and a remote processing system to identify a feature at least partially via data from the at least one ultrasonic sensor, wherein the feature is identified from the ultrasonic sensor data using a simultaneous localization and mapping (SLAM) modeling technique to model the environment, compare a predicted feature position and an estimated position of the wheel along a predicted wheel placement path, and generate an output in response to the estimated position of the wheel of the predicted wheel placement path intersecting with the predicted feature position.

2. The feature avoidance system of claim 1, wherein the feature is identified without assistance of image data.

3. The feature avoidance system of claim 1, wherein the feature is identified exclusively using sensor data from the at least one ultrasonic sensor.

4. The feature avoidance system of claim 1, wherein the feature is identified using a combination of ultrasonic sensor data and at least one of map data and GPS data.

5. The feature avoidance system of claim 1, wherein the response includes an operator alert.

6. The feature avoidance system of claim 1, wherein the response includes an activation of a driver assistance system.

7. The feature avoidance system of claim 1, wherein the dynamic vehicle model is a robot operating systems (ROS) control model incorporating a steering angle of the vehicle, an Ackerman profile of the vehicle, and vehicle movement data.

8. The feature avoidance system of claim 1, wherein the analysis module is further configured to apply the position of the identified feature to one of a map data and a GPS data thereby generating updated map data and to store the updated map data and GPS data in a database.

9. The feature avoidance system of claim 8, wherein the database is remotely accessible by at least a second vehicle.

10. The feature avoidance system of claim 1, wherein the feature is at least one curb.

11. The feature avoidance system of claim 1, wherein the analysis module is configured to cause the controller to perform each of identifying the feature at least partially via data from the at least one ultrasonic sensor, comparing the predicted feature position and the estimated position of the wheel, and generating the output in response to the predicted feature position and the estimated position of the wheel intersecting.

12. A method for detecting and avoiding feature collisions in a commercial vehicle comprising:
    detecting or determining a position of a wheel with a wheel position sensor;
    adjusting a dynamic vehicle model based upon the detected or determined position of the wheel;
    generating a three-dimensional map of an environment based on sensor measurements from at least one ultrasonic sensor;
    locating the position of a wheel within the three-dimensional map;
    identifying at least one feature within the three-dimensional map distinct from the position of the wheel;
    comparing a predicted position of the at least one feature and an estimated position of the wheel at a future time; and
    generating an output in response to the predicted feature position and the estimated position of the wheel intersecting.

13. The method of claim 12, wherein the three-dimensional map is generated using a using a simultaneous localization and mapping (SLAM) system.

14. The method of claim 12, wherein the at least one feature is a curb.

15. The method of claim 12, wherein the position of the wheel is provided on a trailer articulatable relative to a tractor.

16. The method of claim 15, wherein the wheel includes a tire.

17. The method of claim 12, wherein the at least one feature within the three-dimensional map distinct from the position of the wheel is identified using a combination of the sensor measurements from the at least one ultrasonic sensor and at least one of map data and GPS data.

18. The method of claim 12, further comprising applying a position of the at least one feature within the three-dimensional map distinct from the position of the wheel to one of map data and GPS data and storing the updated one of map data and GPS data in a database.

19. The method of claim 18, wherein the database is remotely accessible via at least one other commercial vehicle.

* * * * *